(12) United States Patent
Matsumura et al.

(10) Patent No.: US 8,346,061 B2
(45) Date of Patent: *Jan. 1, 2013

(54) DIGITAL SIGNAL RECORDING/REPRODUCING APPARATUS, RECEIVING APPARATUS

(75) Inventors: Toru Matsumura, Tokyo (JP); Hiroshi Yoshiura, Tokyo (JP); Hiroo Okamoto, Tokyo (JP); Hiroyuki Kimura, Tokyo (JP)

(73) Assignee: Hitachi, Ltd., Tokyo (JP)

( * ) Notice: Subject to any disclaimer, the term of this patent is extended or adjusted under 35 U.S.C. 154(b) by 880 days.

This patent is subject to a terminal disclaimer.

(21) Appl. No.: 11/400,675

(22) Filed: Apr. 7, 2006

(65) Prior Publication Data

US 2006/0188233 A1    Aug. 24, 2006

Related U.S. Application Data

(63) Continuation of application No. 09/839,694, filed on Apr. 19, 2001, now Pat. No. 7,151,888.

(30) Foreign Application Priority Data

Apr. 20, 2000    (JP) .................................. 2000-126229

(51) Int. Cl.
*H04N 9/80* (2006.01)
(52) U.S. Cl. ......... 386/252; 386/353; 386/355; 386/357
(58) Field of Classification Search .............. 386/45–46, 386/125–126
See application file for complete search history.

(56) References Cited

U.S. PATENT DOCUMENTS

| 5,400,402 | A | * | 3/1995 | Garfinkle | 380/231 |
| 5,694,381 | A | | 12/1997 | Sako | |
| 5,825,969 | A | * | 10/1998 | Ono et al. | 386/94 |
| 5,896,454 | A | | 4/1999 | Cookson et al. | |
| 5,987,210 | A | * | 11/1999 | Iggulden et al. | 386/46 |
| 6,694,022 | B1 | | 2/2004 | Matsushita | |
| 6,894,860 | B2 | * | 5/2005 | Sugiyama et al. | 360/69 |
| 7,151,888 | B2 | * | 12/2006 | Matsumura et al. | 386/94 |
| 7,254,312 | B2 | | 8/2007 | Yamada et al. | |

(Continued)

FOREIGN PATENT DOCUMENTS

EP    0809244 A2    11/1997

(Continued)

OTHER PUBLICATIONS

Linnartz "The 'Ticket' Concept for Copying Control Based on Embedded Signalling,", Proceedings of the European Symposium on Research in Computer Security, ESORICS 98, Louvain-la-Nueve, Belgium, Sep. 16-18, 1998.

*Primary Examiner* — Jamie Atala
(74) *Attorney, Agent, or Firm* — Kilpatrick Townsend & Stockton LLP

(57) ABSTRACT

The digital signal recording/reproducing apparatus inputs a digital signal having a control flag as to a temporary copy permission, and records the digital signal temporarily into a recording medium in accordance with conditions in the control flag, then reproducing the digital signal temporarily from the recording medium in accordance with the conditions in the control flag. The recording/reproducing of the temporary copy is permitted, depending on the following conditions: The recording medium's type, the reproducing point-in-time, the reproducing time-period, and the reproducing frequency. With this method employed, even in a program permitting no recording, the temporary recording/reproducing is permitted under a condition of being limited to the time-shift recording on the receiving side.

15 Claims, 9 Drawing Sheets

U.S. PATENT DOCUMENTS

2001/0038744 A1  11/2001  Yamada et al.

FOREIGN PATENT DOCUMENTS

| | | | |
|---|---|---|---|
| EP | 0809244 A2 * | 11/1997 | |
| EP | 0809244 A3 | 11/1997 | |
| EP | 0878794 A2 | 11/1998 | |
| EP | 0878794 A3 | 11/1998 | |
| EP | 1130915 A2 | 9/2001 | |
| JP | 2000-057059 A | 2/2000 | |
| JP | 2001-245223 A | 9/2001 | |
| WO | WO 97/25816 A1 | 7/1997 | |
| WO | WO99/46933 A1 | 9/1999 | |

* cited by examiner

DIGITAL SIGNAL RECORDING/REPRODUCING APPARATUS, RECEIVING APPARATUS

BACKGROUND OF THE INVENTION

1. Field of the Invention

The present invention relates to a digital signal recording/reproducing apparatus, a digital signal receiving apparatus, and a digital signal transmitting method that are used for receiving a digital signal in a digital broadcast, a cable television, or the like, and for performing a copy control therefor so as to record/reproduce the digital signal.

2. Description of the Related Art

Generally speaking, there exist the following 4 types of conventional copy control information: Never Copy that means not to permit of being copied even once, Copy Once that means to permit of being copied only once, Copy Free that means to permit of being copied any number of times, and No More Copy that means a child copy of the Copy Once. Such information as the Never Copy, the Copy Once, and the Copy Free has been written into a digital signal from, e.g., a broadcasting station. With respect to the above-described copy information, when a user tries to make their backup copies into his or her recording medium, the results are as follows: The Never Copy, which never permits of being copied, can not absolutely be recorded. The Copy Once can be recorded as a time-shift of shifting the watching time, and the user can make its child copy into the recording medium just once. At that time, the digital signal written into the recording medium becomes the No More Copy, which means that it is impossible to produce its child copy further from then on. The user can copy with the Copy Free any number of times.

When wishing to watch a program on the air at a convenient time, or wishing to watch the program not one time but many times repeatedly, there is a request for recording the program once into the user's recording apparatus for the purpose of the time-shift. If, however, a broadcast subjected to the copy control is on the air in the digital broadcast, the cable broadcast, or the like, it becomes absolutely impossible to perform the recording for the purpose of the time-shift. Moreover, a digital record based on the digital broadcast or the cable broadcast, which will become the mainstream in the future, can be recorded with its high picture-quality maintained. This condition enhances even further the ratio of such a scheme as the above-described Never Copy that never permits of the recording, eventually giving rise to an expectation that the regulation toward the recording will become severer than that in the case of an analogue record.

In this way, the Never Copy, which is expected to be used a lot in the digital broadcast, is against the user's request for wishing to perform the time-shift recording. In addition, since the user cannot change freely the time to watch or to listen to a program, the user cannot help restricting his or her behavior or giving up the watching or the listening. This results in a situation where only a portion of the users can enjoy the benefit of the digital broadcast.

SUMMARY OF THE INVENTION

It is an object of the present invention to provide, by eliminating the above-described inconveniences, a digital signal recording/reproducing apparatus, a digital signal receiving apparatus, and a digital signal transmitting method where, even in the case of such a scheme as the Never Copy that never permits of the recording, a recording/reproducing control limited to the time-shift recording is executed on the digital signal receiving side.

The above-described object is accomplished by the following steps: Inputting a digital signal having a control flag concerning a temporary copy permission, and recording the digital signal temporarily into a 1st recording medium in accordance with a condition of the control flag, and reproducing the digital signal temporarily from the 1st recording medium in accordance with the condition of the control flag, and further, recording the digital signal into a 2nd recording medium in accordance with the condition of the control flag, the digital signal having been reproduced from the 1st recording medium.

BRIEF DESCRIPTION OF THE DRAWINGS

These and other objects, features and advantages of the present invention will become more readily apparent from the following detailed description when taken in conjunction with the accompanying drawings, wherein.

DETAILED DESCRIPTION OF THE EMBODIMENTS

Figure 1:
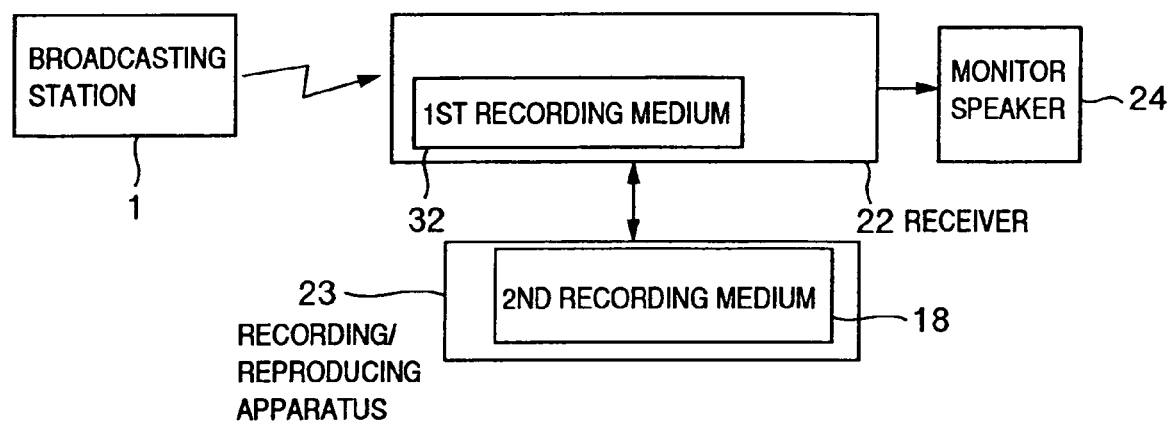
FIG. 1 is a diagram for illustrating a 1st embodiment of a receiving/recording/reproducing system of the present invention.

FIG. 1 illustrates a 1st embodiment of a receiving/recording/reproducing system employing the present invention. A receiver 22 receives a broadcast signal sent out from a broadcasting station 1. Then, the received signal is outputted by a monitor speaker 24, and at the same time, is recorded/reproduced by a recording/reproducing apparatus 23. The receiver 22 temporarily records the signal into a 1st recording medium 32. Incidentally, the 1st recording medium 32 may be set outside the receiver and be connected thereto.

Also, the receiver 22 may be a receiver that receives a signal other than the broadcast signal, e.g., a signal transmitted through a cable or a network.

In the broadcasting station 1, a digital signal is superimposed on control flags for performing the recording/reproducing control, and is subjected to the modulation, then being sent out to the receiver 22. A signal connecting between the broadcasting station 1 and the receiver 22 is a radio wave signal, or an electrical or optical signal with a cable or an optical fiber employed as its medium. The control flags are a copy control flag of each of the Copy Once, the Never Copy, and the Copy Free, and a control flag of a temporary copy (which is referred to as Temp. Copy flag, hereinafter). This Temp. Copy flag is further classified into the types of a reproducing point-in-time, a reproducing time-period, a reproducing frequency, and a recording medium. These types are designed for checking the following, respectively: Whether or not a point-in-time at the time of the reproduction is earlier than the specified point-in-time, whether or not the point-in-time at the time of the reproduction is included within the specified time-period, whether or not the reproducing number is within the specified frequency, and whether or not the recording medium is a specified recording medium. Table 1 shows the recording of the inputted digital signal into the 1st recording medium with respect to the respective copy control flags, and the relationship in the recording state from the 1st recording medium to a 2nd recording medium. Table 1 indicates whether or not the digital signal can be recorded into the 1st recording medium 32, and whether or not, after recording the digital signal into the 2nd recording medium 18, the recorded signal can be reproduced and can be recorded into the 2nd recording medium 18 again. Incidentally, in the case where the user directly performs the recording into the 2nd recording medium 18 instead of performing the recording into the 1st recording medium 32, the user records the digital signal into the 2nd recording medium 18 in accordance with the copy control flags.

may be performed in such a manner as to convert the Copy Once into the No More Copy. Meanwhile, performing the recording without converting the Copy Once at all makes it possible to record the temporarily recorded digital signal into the 2nd recording medium 18.

The recording from the 1st recording medium 32 to the 2nd recording medium 18 is as follows: When the Temp. Copy flag of the inputted digital signal is temporarily recording-capable, the inputted digital signal recorded temporarily into the 1st recording medium 32 cannot be recorded when the copy control flag of the inputted digital signal is the Never Copy. With respect to the Copy Free, however, the recording can be performed. In addition, with respect to the Copy Once, the recording can be performed by converting the Copy Once into the No More Copy. If the Temp. Copy flag of the inputted digital signal is temporarily recording-incapable, the recording can be performed only when the copy control flag of the inputted digital signal is the Copy Free. In this way, by newly adding the Temp. Copy flag to the Never Copy the copy of which has been completely prohibited conventionally, it becomes possible to permit the temporary copy.

TABLE 1 the recording/reproducing with respect to the copy control flags

| | Recording | | | Reproducing (2nd recording medium) | |
|---|---|---|---|---|---|
| | 1st recording medium | | | Recording-capable recording medium | Recording-incapable recording medium |
| | Temporarily recording-capable | Temporarily recording-incapable | 2nd recording medium | | |
| Never Copy | OK | NG | NG | NG | OK |
| Copy Once | OK | OK | OK | NG | OK |
| Copy Free | OK | OK | OK | OK | OK |
| No More Copy | OK | NG | NG | OK | NG |

The recording into the 1st recording medium is as follows: When the Temp. Copy flag of the inputted digital signal is temporarily recording-capable, even if the copy control flag is any one of the Never Copy, the Copy Free, and the Copy Once, the inputted digital signal can be recorded into the 1st recording medium 32 without being converted. If the Temp. Copy flag of the inputted digital signal is temporarily recording-incapable, the recording can be performed only when the copy control flag is the Copy Free or the Copy Once. At that time, the recording is performed in such a manner as to convert the Copy Once flag into the No More Copy flag. Otherwise, it is also allowable to make it impossible to perform the recording with respect to the Copy Once. Moreover, it is also allowable to make it impossible to perform the recording with respect to all the flags, including the Copy Free.

Additionally, if the copy control flag is the No More Copy, it is also allowable to employ and execute the same processing as that of the Never Copy.

At the time of the recording into the 1st recording medium 32 when the Temp. Copy flag is temporarily recording-capable, if the copy control flag is the Copy Once, the recording Also, regarding the time of the reproduction from the 2nd recording medium 18, confirming the copy control flags makes it possible to prohibit the reproduction from a medium into which an illegal copy has been made. For example, if the medium that will be reproduced is a recording-capable medium, i.e., the recording medium into which the inputted digital signal has been recorded, the copy control flag must be the No More Copy or the Copy Free. Accordingly, when the copy control flag is the Never Copy or the Copy Once, the reproduction is prohibited. If the medium that will be reproduced is a recording-incapable medium, the copy control flag must be the Never Copy, the Copy Once, or the Copy Free. Consequently, when the copy control flag is the No More Copy, the reproduction is prohibited.

The temporary copy at the time when the Temp. Copy flag is temporarily recording-capable is a temporary copy that is intended for the time-shift and is limited thereto. As a result, by providing the following constraint conditions at the time of the recording/reproducing, it becomes possible to make the limitations on the functions more secure.

Table 2 shows each of the control flags of the Temp. Copy flag concerning the recording/reproducing toward the 1st recording medium 32.

TABLE 2 the respective control flags of the temporary copy into the 1st recording medium

| | Recording-capable | Reproducing-incapable | Recording-capable |
|---|---|---|---|
| Reproducing point-in-time flag | Earlier than specified point-in-time | Later than specified point-in-time | OK |
| Reproducing time-period flag | Within specified time-period | Out of specified time-period | OK |
| Reproducing frequency flag | Within specified frequency | Out of specified frequency | OK |
| Recording medium flag | Specified recording medium | Out of specified recording medium | Specified recording medium |

Figure 2:
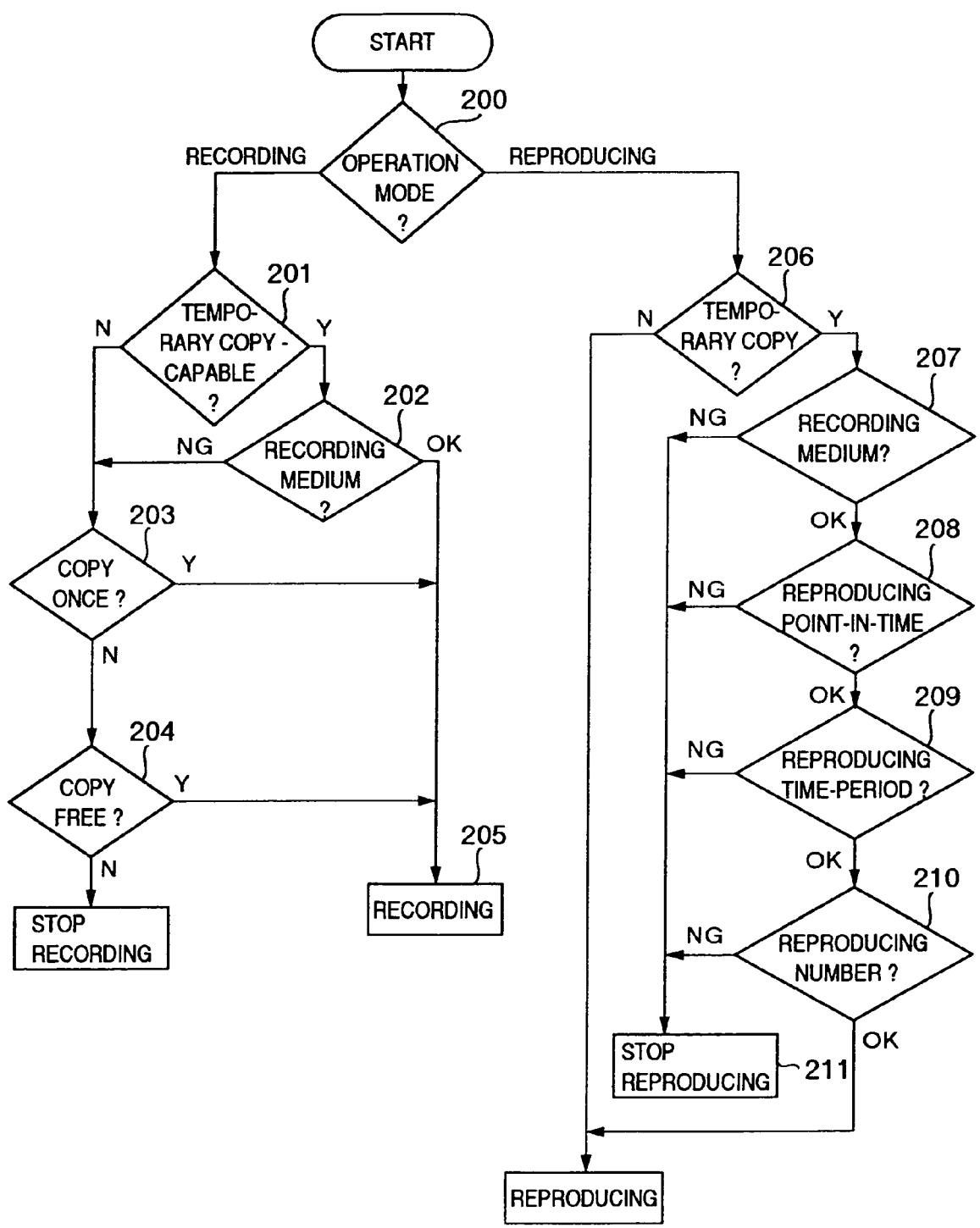
FIG. 2 is a flow diagram concerning the control flags of the present invention.

Each of the copy control flags on Table 2 will be explained in association with FIG. 2. FIG. 2 illustrates a flow chart of the operation at the time of the recording/reproducing toward the 1st recording medium 32.

At the time of the recording (Step 200), the Temp. Copy control flag is detected. When the Temp. Copy control flag exists and is temporarily recording-capable (Step 201), a checking is executed as to whether or not the 1st recording medium 32 corresponds to a medium specified by the recording medium flag (Step 202). If the 1st recording medium is the corresponding recording medium, the recording of the digital signal is performed (Step 205). In the case of a recording medium that is unable to be extracted, e.g., a hard disk drive or a fixed flash memory, the recording is permitted. In the case of a recording medium that is able to be extracted, e.g., a VTR, no recording is permitted. Also, the recording is permitted for a recording medium built in the receiver 22, and no recording is permitted for a recording medium set outside the receiver and connected thereto. When performing the recording, a recording finishing point-in-time or a recording starting point-in-time is recorded into the 1st recording medium 32 or a register or the like inside the receiver 22. When the Temp. Copy flag is temporarily recording-incapable (Step 201), the recording is performed in accordance with the copy control flag. Namely, the recording is performed when the copy control flag is the Copy Once or the Copy Free (Step 203 or 204).

At the time of the reproduction (Step 200), a checking is executed as to whether or not the digital signal to be reproduced has been temporarily recorded. The checking as to whether or not the signal is the temporarily recorded signal may be performed by checking whether or not the Temp. Copy control flag exists (Step 206), or by checking beforehand-recorded information indicating whether or not the signal is the temporarily recorded signal. In the case where the digital signal is the temporarily recorded signal, as illustrated in Table 2 and FIG. 2, the following are checked: The recording medium flag (Step 207), the reproducing point-in-time flag (Step 208), the reproducing time-period flag (Step 209), and the reproducing frequency flag (Step 210). When the recording medium flag is detected, the type of the 1st recording medium 32 is detected so as to execute a checking as to whether or not the detected 1st recording medium 32 is a medium specified by the flag. If the 1st recording medium is not the permitted type of recording medium (Step 207), the reproduction is stopped or the reproducing output is cut off (Step 211). When the reproducing point-in-time flag is detected (Step 208), the present point-in-time is compared with a specified point-in-time. If the present point-in-time falls within the range earlier than the specified point-in-time, the reproduction is continued just as it is. Meanwhile, if the present point-in-time exceeds (later than) the specified point-in-time, the reproduction is stopped or the reproducing output is cut off (Step 211). When the reproducing time-period flag is detected (Step 209), the present point-in-time is compared with a specified point-in-time determined from the recording point-in-time and a specified time-period. If the present point-in-time falls within the range earlier than the specified point-in-time, the reproduction is continued just as it is. Meanwhile, if the present point-in-time exceeds (later than) the specified point-in-time, the reproduction is stopped or the reproducing output is cut off. A reproducing-capable point-in-time is assumed to be a point-in-time that is exactly 24 hours after the recording point-in-time, e.g., by 12 AM on the next day. A reproducing-capable time-period is set to be as, e.g., within 6 hours, within 1 day, or within 1 week. When the reproducing frequency flag is detected (Step 210), the reproducing frequency up to the present is compared with a reproducing-capable frequency. If the reproducing frequency falls within the reproducing-capable frequency, the reproduction is continued just as it is. Meanwhile, if the reproducing frequency is larger than the reproducing-capable frequency, the reproduction is stopped or the reproducing output is cut off (Step 211). The reproducing-capable frequency is set to be as, e.g., 1 time or 2 times. Also, In the case where the digital signal is not the temporarily recorded signal, no limitations on the reproduction are performed.

The digital signal recorded into the 1st recording medium 32 may also be set so that it will be automatically erased depending on the time-limit or the reproducing frequency. This allows the reproduction limitations to be executed more securely. For example, when the present point-in-time exceeds the time-limit based on the reproducing point-in-time flag or the reproducing time-period flag, the digital signal recorded into the 1st recording medium 32 is erased. Similarly, when the reproducing frequency exceeds the reproducing frequency specified by the reproducing frequency flag, the digital signal recorded into the 1st recording medium 32 is erased. Although the erasing may be performed at the time of the reproduction, it is also possible to periodically confirm the time-limit of the recorded signal regardless of whether or not to perform the reproduction and to automatically erase the digital signal when the time-limit has passed away. Also, it is also allowable to unconditionally erase, regardless of whether or not there exist the flags, the digital signal when a constant time-limit or reproducing frequency has passed away. Moreover, the erasing may also be performed not by the reproducing frequency but by the recording frequency toward the 2nd recording medium 18. For example, by erasing the digital signal after the recording into the 2nd recording medium 18 has been performed one time, it becomes possible to prevent a plurality of copies from being created. The user can also judge a recording-capable remaining quantity of the 1st recording medium 32 from the data displayed on such a display apparatus as a monitor or the speaker 24, thereby being capable of erasing the recorded digital signal.

Incidentally, concerning the erasing of the digital signal, the digital signal may be erased fully, or a portion of the digital signal or a portion of information indicating the digital signal may be erased or be modified. Otherwise, the reproduction of the digital signal may be made impossible by adding information indicating that the reproduction is impossible. The fully erasing of the digital signal allows the erasing to be executed completely. Also, the partial erasing, or the partial modification, or adding the information so as to make the reproduction impossible allows the erasing processing to be executed in a short while.

Furthermore, one program as a whole may be erased at a time. Otherwise, the one program may be erased partially, depending on a reproduced portion, a recorded time, or the like.

Table 3 shows an example of the combination of the recording states into the 1st recording medium and the 2nd recording medium with respect to the copy control of the inputted signal. If the recording is temporarily recording-capable with respect to the Copy Once, the 1st recording medium 32 is temporarily recording-capable. In addition, the recording can be performed into the 2nd recording medium 18 after converting, into the No More Copy, the Copy Once signal from the 1st recording medium 32. If the recording is temporarily recording-capable with respect to the Never Copy, although the 1st recording medium 32 is temporarily recording-capable, the 2nd recording medium 18 is recording-incapable. If the recording is temporarily recording-incapable with respect to the Never Copy, both the 1st recording medium 32 and the 2nd recording medium 18 are recording-incapable.

TABLE 3 the combination of the recording states into the 1st recording medium and the 2nd recording medium

| Copy control flag | Temporary recording | Recording into 1st recording medium | Recording into 2nd recording medium |
| --- | --- | --- | --- |
| Copy once | Capable | Temporary copy-capable | Recording-capable |
| Never Copy | Capable | Temporary copy-capable | Recording-incapable |
| Never Copy | Incapable | Recording-incapable | Recording-incapable |

Figure 3:
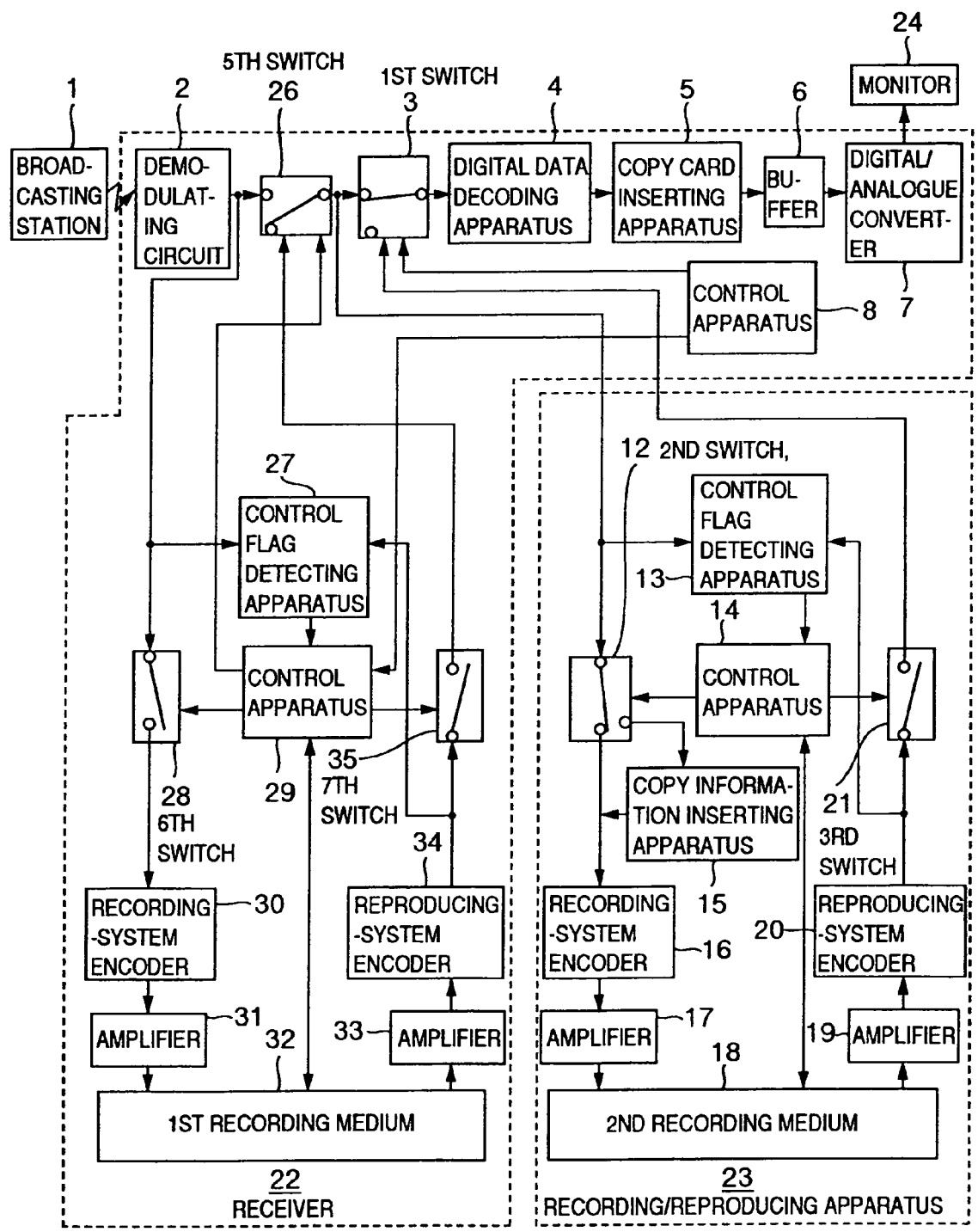
FIG. 3 is a detailed configuration diagram of the embodiment in FIG. 1.

FIG. 3 is a detailed diagram for illustrating the 1st embodiment. The receiver 22 includes the following components: A demodulating circuit 2, a digital signal decoding apparatus 4, a copy card inserting apparatus 5, a buffer 6, a digital/analogue converter 7, a 2nd control apparatus 8, a 1st control flag detecting apparatus 27, a 1st control apparatus 29, a recording-system encoder 30, a 1st amplifier 31, a 1st recording medium 32, a 2nd amplifier 33, and a 1st reproducing-system encoder 34. The recording/reproducing apparatus 23 includes the following components: A 2nd control flag detecting apparatus 13, a 3rd control apparatus 14, a copy information inserting apparatus 15, a 2nd recording-system encoder 16, a 3rd amplifier 17, a 2nd recording medium 18, a 4th amplifier 19, and a 2nd reproducing-system encoder 20.

Next, the operation will be explained in being separated into the operation of the receiver 22 and that of the recording/reproducing apparatus 23. In the receiver 22, the operation is as follows: The demodulating circuit 2 receives and demodulates the broadcast signal sent from the broadcasting station 1 through a radio wave, a cable, or the like, then outputting the digital signal. The demodulating circuit 2 executes the modulation, the synchronization, the sorting of the data, the error correction, and so on, then outputting the digital signal. The 2nd control apparatus 8, which is not illustrated though, controls the operation of the receiver 22 in accordance with an input from a key or a remote controller. Based on the control by the 2nd control apparatus 8, the 1st control apparatus 29 executes the control of the recording/reproducing toward the recording media. The 1st control apparatus 29, at the time of the reception, causes a 5th switch 26 to select the demodulating circuit 2, thereby outputting the received signal to the 1st switch 3 and the recording/reproducing apparatus 23. Also, it has been instructed to perform the temporary recording of the received signal into the recording medium 32, and the 1st control flag detecting apparatus 27 detects the Temp. Copy flag that is temporary copy-capable as the control flag. When the detecting apparatus 27 judges that the recording is temporarily recording-capable, the 1st control apparatus 29 switches a 6th switch 28 ON. Otherwise, the 6th switch 28 may be in the ON state usually. In this case, when the recording is temporarily recording-incapable, the 6th switch 28 is cut off. For example, if it takes a considerable time to detect the Temp. Copy flag, i.e., if it is impossible to detect that the recording is temporarily recording-capable during a fixed length of time-period, the 6th switch 28 is cut off. If the 6th switch 28 is switched ON, the digital signal is subjected to the modulation so that the 1st recording-system encoder 30 can record the received signal into the 1st recording medium 32. As a result, the received signal is recorded into the 1st recording medium 32 through the 1st amplifier 31. At this time, the recording point-in-time when the received signal has been recorded into the 1st recording medium 32 is recorded into the 1st recording medium 32, or the recording point-in-time is recorded into a nonvolatile memory built in the 1st control apparatus 29. The recording into the 1st recording medium 32 is executed when, for example, the digital signal is temporarily recorded in accordance with the use's instruction. Also, the recording into the 1st recording medium 32 may be always recorded endlessly. Namely, the signal over a fixed length of time, e.g., 10 hours, may also be always recorded endlessly. When detecting the recording medium flag after detecting the Temp. Copy flag, the recording is made incapable of being performed unless the 1st recording medium 32 is a medium specified by the recording medium flag. For example, the control is as follows: A magneto-optic disk is set to be "1" and any other medium is set to be "0", where it is assumed that "0" indicates a temporarily recording-capable medium and "1" indicates a temporarily recording-incapable medium.

Meanwhile, at the time of the reproduction, the user instructs the 2nd control apparatus 8 to start the reproduction. Then, the 2nd control apparatus 8 connects the 5th switch 26 to a 7th switch 35, thereby reproducing the digital signal from the 1st recording medium 32. When the digital signal has been reproduced, a modulated signal is outputted from the 1st recording medium 32 and is amplified by the 2nd amplifier 33, then being converted into a digital signal by the 1st reproducing-system encoder 34. The 1st control flag detecting apparatus 27 checks the control flag of the digital signal outputted from the 1st reproducing-system encoder 34. If it is detected that, for example, the reproducing point-in-time flag limits the reproducing point-in-time, the 1st control apparatus 29 checks the reproducing point-in-time in accordance with the detected signal from the 1st control flag detecting apparatus 27. If the present point-in-time falls within the range of a reproducing-permitted point-in-time and the 1st control apparatus 29 judges that the signal is reproducing-capable, the 1st control apparatus 29 switches the 7th switch 35 ON. Also, the 5th switch 26 selects the outputs from the 7th switch 35, and the reproduced digital signal is outputted to the digital signal decoding apparatus 4 through the 5th switch 26. If it should take the 1st control flag detecting apparatus 27 a considerable long time to detect the control flag, the 7th switch 35 may be in the ON state usually. In this case, if it is impossible to find out the control flag within a defined time, the 7th switch 35 is cut off. If it is detected that, for example, the reproducing time-period flag limits the reproducing point-in-time, the 1st control apparatus 29 compares the reproducing point-in-time with the recording point-in-time of the recorded digital signal in accordance with the detected signal from the 1st control flag detecting apparatus 27, thereby checking whether or not the reproducing point-in-time falls within the range of a reproducing-capable time-period. If the reproducing point-in-time falls within the permitted time-period, the 1st control apparatus 29 permits the reproduction, switching the 7th switch 35 ON. If it should take a considerable time to detect the control flag, the 7th switch 35 may be in the ON state usually. At this time, if it is impossible to find out the control flag within a defined time, the 7th switch 35 is cut off. In this way, setting the reproducing time-period makes it possible to execute the operation that is quite similar to the operation of rental videos. Setting the reproducing time-period to be a simple date, e.g., 1 day or 2 days, reduces a quantity of the control information, thereby making the control easier. When the 1st control flag detecting apparatus 27 detects the reproducing frequency flag as the control flag, the 1st control flag detecting apparatus 27 sends the detected signal to the 1st control apparatus 29. The 1st control apparatus 29 stores the reproducing frequency at this time into the memory, or records the reproducing frequency into the 1st recording medium 32. At the same time, if the reproducing frequency at this time falls within a reproducing-capable frequency, the 1st control apparatus 29 switches the 7th switch 35 ON. If it should take a considerable time to detect the control flag, the 7th switch 35 may be in the ON state usually. In this case, if it is impossible to find out the control flag within a defined time, the 7th switch 35 is cut off. The reproducing frequency is set to be a simple frequency, e.g., 1 time or 2 times and, in the case where the user reproduces the digital signal every 2 seconds or executes a high-speed search when searching for a portion that he or she wishes to watch, no counting is executed. In this way, in the flag where the control flag definitely designates the reproducing frequency, performing the limitation on the frequency makes it possible to expect the effect that is quite similar to the effect obtained by watching theater movies. Even if the reproducing frequency is 1 time, when wishing to suspend the program just a little while or intending for the time-shift, the recording medium 32 can be used as a buffer.

In this way, by using these control flags and temporarily recording and reproducing the digital signal in accordance with the use's instruction with the use of the receiver 22, it becomes possible to implement the time-shift of the reproducing point-in-time.

Even if there exists none of the control flags for controlling the reproducing point-in-time and the reproducing frequency, if a hard disk drive, a DRAM, or the like is set as the 1st recording medium 32, watching the signal using the other reproducing apparatuses becomes difficult since the 1st recording medium 32 is unremovable from the receiver 22. This makes impossible the use for the signal other than the time-shift by an individual.

The digital signal received or reproduced by the 1st recording medium 32 is outputted to the 1st switch 3 and the recording/reproducing apparatus 23 by the 5th switch 26. At the time of the reception or at the time of the reproduction from the 1st recording medium 32, the 1st switch 3 selects an output from the 5th switch 26. Accordingly, the received or reproduced digital signal is inputted into the digital signal decoding apparatus 4 so as to be decoded. Next, as necessary, a copy card signal at the time of an analogue outputting is inserted into the digital signal by the copy card inserting apparatus 5. Moreover, the digital signal is inputted into the digital/analogue converter 7 through the buffer 6 so as to be converted into an analogue signal, then being outputted to the monitor speaker 24. Incidentally, the copy card inserting apparatus 5 may be located after the buffer 6, or after the digital/analogue converter 7.

Next, the operation in the recording/reproducing apparatus 23 will be explained. In the recording control, the following operation is executed: The 2nd control flag detecting apparatus 13 detects the control flag from the digital signal transmitted from the receiver 22. The control flag is the copy control flag, e.g., the Never Copy, the Copy Once, or the Copy Free. If the 2nd control flag detecting apparatus 13 has detected the Never Copy, the 3rd control apparatus 14 cuts off a 2nd switch 12, thus terminating the recording operation. If the 2nd control flag detecting apparatus 13 has detected the Copy Once, the 3rd control apparatus 14 connects the receiver 22 to the copy information inserting apparatus 15 through the use of the 2nd switch 12, thereby inserting the copy control flag equivalent to the No More Copy into the digital signal outputted from the receiver 22. After the copy control flag has been inserted, the digital signal is subjected to the modulation so that the 2nd recording-system encoder 16 can record the digital signal into the 2nd recording medium 18. Moreover, the digital signal is amplified by the 3rd amplifier 17, then being recorded into the 2nd recording medium 18. If the 2nd control flag detecting apparatus 13 has detected the Copy Free, the 3rd control apparatus 14 connects the receiver 22 to the 2nd recording-system encoder 16 through the use of the 2nd switch 12, thereby recording the digital signal into the 2nd recording medium 18 without any limitations. If none of the above-described copy control flags has been detected, the 2nd switch 12 is cut off. If it should take the 2nd control flag detecting apparatus 13 a considerable time to detect the control flag, the 2nd switch 12 may be in the ON state usually. At this time, there is established a defined time and if it has taken a time longer than that, the 2nd switch 12 is cut off.

In the reproducing control, the following operation is executed: The modulated digital signal is outputted from the 2nd recording medium 18, and is amplified by the 4th amplifier 19, then being demodulated by the 2nd reproducing-system encoder 20. Then, toward the demodulated digital signal, the 2nd control flag detecting apparatus 13 detects the control flag such as the copy control flag. Furthermore, the 3rd control apparatus 14 checks whether the 2nd recording medium 18 is a reproducing-specified medium or a recording-capable medium. At the time of the reproduction, if the recording medium is reproducing-specified, the control flag is the Never Copy or the Copy Free alone. If the recording medium is recording-capable, the control flag is the No More Copy or the Copy Free alone. In this way, when the type of the 2nd recording medium 18 and the copy control flag are recording-capable and the No More Copy or the Copy Free, or are reproducing-specified and the Never Copy or the Copy Free, the 3rd control apparatus 14 performs the reproduction in a state of having switched the 3rd switch 21 ON. In the other cases, the 3rd control apparatus 14 performs the reproduction in a state of having switched the 3rd switch 21 OFF. If it should take the 2nd control flag detecting apparatus 13 a considerable longer time to detect the control flag, the 3rd switch 21 may be in the ON state usually. In this case, there is established a defined time as is the case with the above-described time of the recording and, at a point-in-time when a time longer than that has passed away, if the signal cannot be judged to be reproducing-capable, the 3rd switch 21 is cut off. At the time of the reproduction, the 2nd control apparatus 8 causes the 1st switch 3 in the receiver 22 to select an output from the 3rd switch 21. When the 2nd recording medium 18 is recording-capable and the No More Copy or the Copy Free, or the 2nd recording medium 18 is reproducing-specified and the Never Copy or the Copy Free, the reproduced digital signal is decoded by the digital signal decoding apparatus 4. Then, as necessary, a copy card signal at the time of an analogue outputting is inserted into the digital signal by the copy card inserting apparatus 5. In addition, the digital signal is converted into an analogue signal by the digital/analogue converter 7 through the buffer 6, then being outputted to the monitor speaker 24. In this way, the use of the digital signal having the control flag allows the copy control/reproduction control to be executed toward the 2nd recording medium 18.

As having been described so far, the functional separation between the temporarily-recording 1st recording medium 32 and the copy control executing 2nd recording medium 18 allows the time-shift to be implemented for the copy-controlled signal as well, making it possible to execute the copy control simultaneously.

Figure 4:
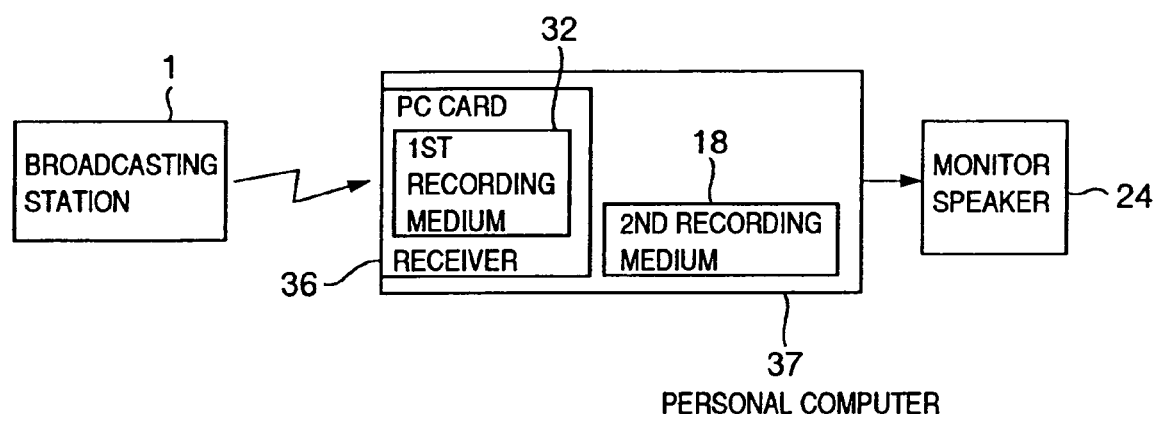
FIG. 4 is a diagram for illustrating a 2nd embodiment of the present invention.

FIG. 4 illustrates a 2nd embodiment. A reference numeral 37 denotes, e.g., a personal computer, which includes a digital signal decoding apparatus 4, a copy card inserting apparatus 5, a buffer 6, a digital/analogue converter 7, and a 2nd control apparatus 8. A 2nd recording medium 18, such as a magneto-optic high-capacity recording-capable disk, is built in the personal computer 37. The decoding function or the like in the digital signal decoding apparatus 4 may also be executed by a software. A numeral 36 denotes a PC card that is inserted into the personal computer 37. A demodulating circuit 2 and a 1st recording medium 32 are built in the card. The receiving function of the PC card 36 may be a data receiving function in a LAN or the like, and a broadcasting station 1 may be a server on the LAN.

Figure 5:
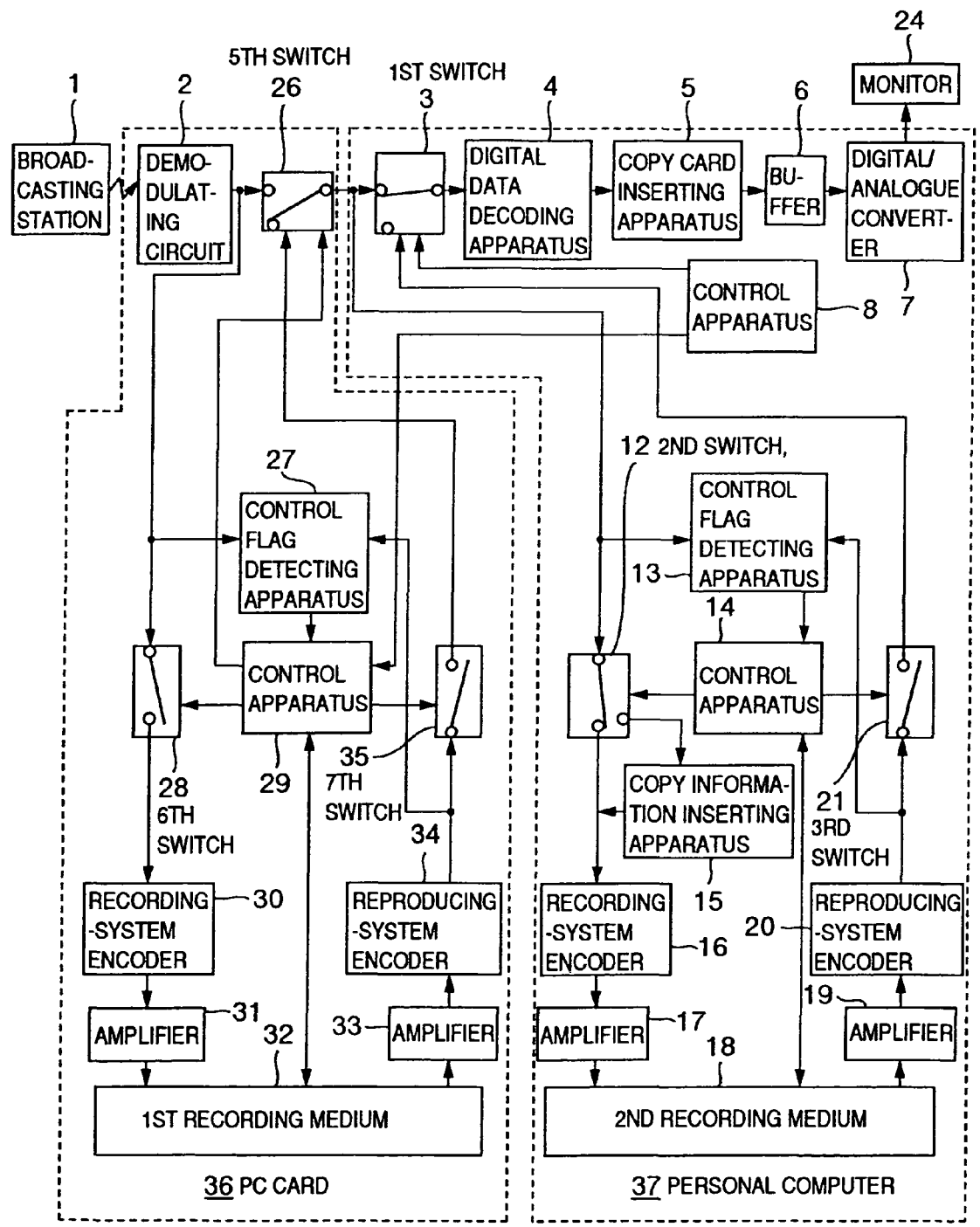
FIG. 5 is a detailed configuration diagram of the embodiment in FIG. 4.

FIG. 5 illustrates the details in FIG. 4. There exist the following components inside a personal computer 37: A 2nd control flag detecting apparatus 13, a 2nd switch 12, a 3rd control apparatus 14, a 3rd switch 21, a copy card inserting apparatus 15, a 2nd recording-system encoder 16, a 3rd amplifier 17, a 2nd recording medium 18, a 4th amplifier 19, a 2nd reproducing-system encoder 20, and a 3rd switch 21. On account of this, a 1st recording medium 32 inside a PC card 36 illustrated in FIG. 5 can be used as a recording medium for executing the temporary recording for the time-shift. In this case, since the 1st recording medium 32 is easy to carry with the PC card 36, the 1st recording medium 32 had better be a memory that has a volatility or a first-in first-out function of being able to perform the reproduction only one time but having no volatility. The operations of the respective components are the same as those in the case in FIG. 2. Also, the PC card 36 may be connected to the broadcasting station 1 through a cable or an optical fiber.

Figure 6:
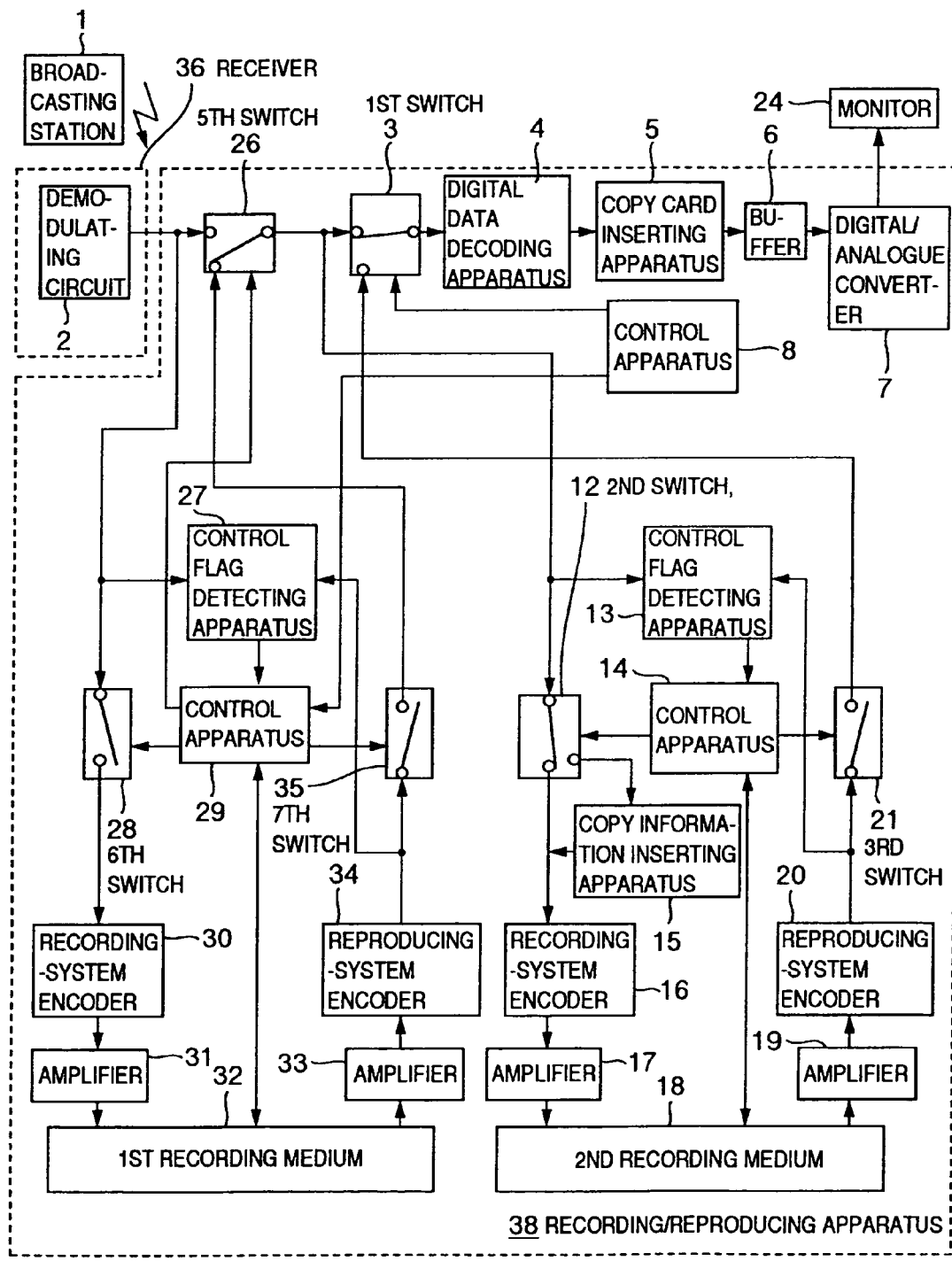
FIG. 6 is a diagram for illustrating a 3rd embodiment of the present invention.

FIG. 6 illustrates a 3rd embodiment. In the present embodiment, a PC card which is a receiver 36 has only a demodulating circuit 2, and the other apparatuses are included in a personal computer which is a recording/reproducing apparatus 23. For example, a 1st recording medium 32 is a hard disk or a DRAM in the personal computer, and a 2nd recording medium 18 is an external magneto-optic high-capacity recording-capable disk, or the like. The respective apparatuses in the recording/reproducing apparatus 23 may be implemented by the OS or an application software of the personal computer. The PC card 36 may be connected to a broadcasting station 1 through a cable or an optical fiber. The 1st recording medium 32 and the 2nd recording medium 18 may be a recording medium common thereto.

Figure 7:
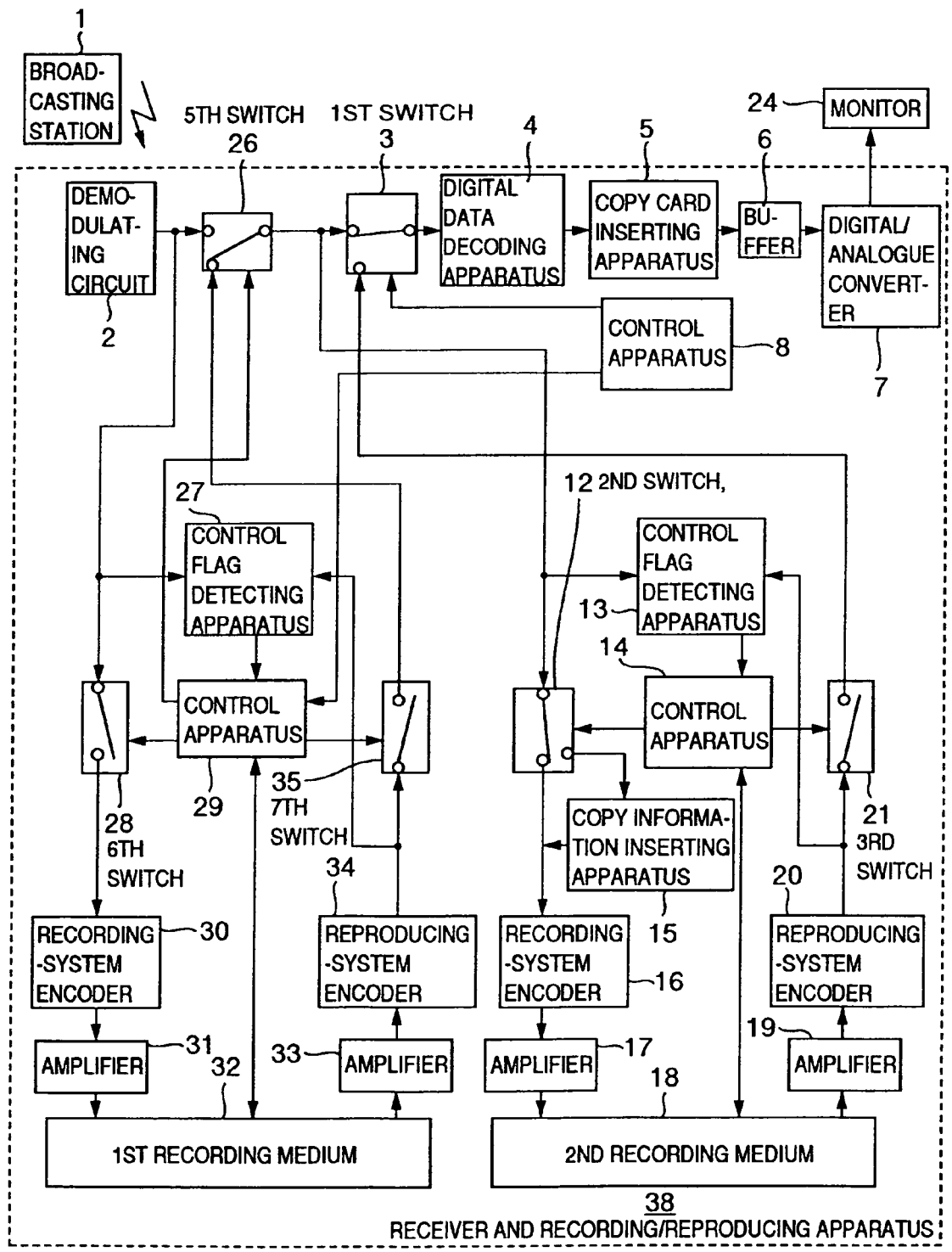
FIG. 7 is a diagram for illustrating a 4th embodiment of the present invention.

FIG. 7 illustrates a 4th embodiment. In the present embodiment, a receiver and a recording/reproducing apparatus are integrally formed. Accordingly, the embodiment is rather similar to, e.g., a video deck. The embodiment may be connected to a broadcasting station 1 through a cable or an optical fiber. A 1st recording medium 32 and a 2nd recording medium 18 may be a recording medium common thereto.

Figure 8:
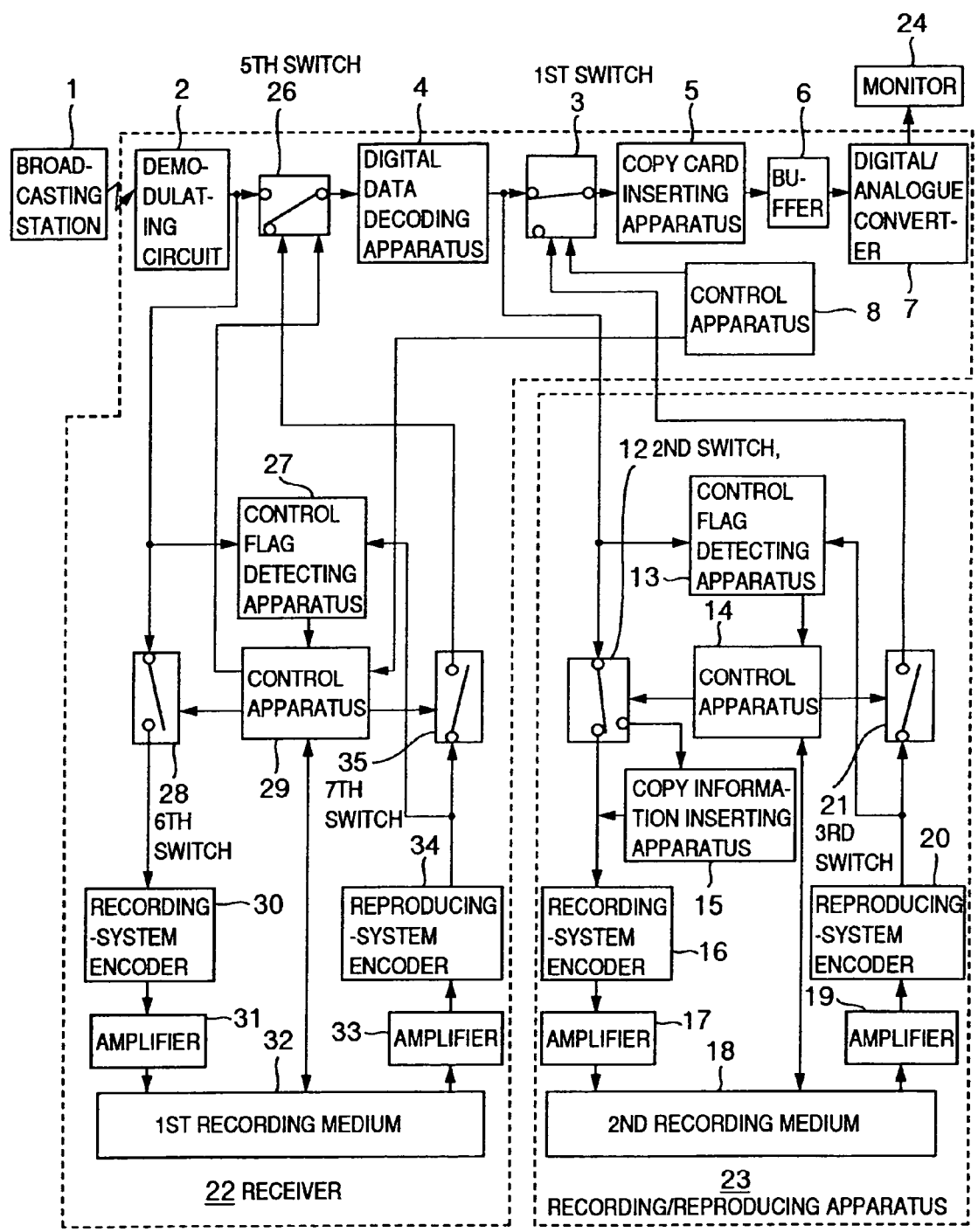
FIG. 8 is a diagram for illustrating a 5th embodiment of the present invention.

FIG. 8 illustrates a 5th embodiment. In FIG. 8, the digital signal decoded by a digital signal decoding apparatus 4 is outputted to a recording/reproducing apparatus 23. When the control flag is added to the digital signal by electronic watermark, the information is still latched even after the signal has been decoded. Accordingly, the detection is also possible from the decoded information. Incidentally, when the control flag is added as ordinary digital information, it is satisfying enough that the digital signal is decoded and the control flag's information added to the digital signal is added to the decoded signal again. At the time of the recording, a 2nd control flag detecting apparatus 13 detects the control flag so as to send the detected signal to a 3rd control apparatus 14. A 2nd switch 12 connects or cuts off the digital signal decoding apparatus 4 and a 1st recording-system encoder 16, thereby performing the control of the recording. At the time of the reproduction, the 2nd control flag detecting apparatus 13 detects the control flag from the after-decoded digital signal from a 2nd reproducing-system encoder 20. The 2nd control flag detecting apparatus 13 sends the detected signal to the 3rd control apparatus 14, and the 3rd control apparatus 14 sends a control signal to a 3rd switch 21. In accordance with the control signal, the 3rd switch 21 connects or cuts off the 2nd reproducing-system encoder 20 and a 1st switch 3, thereby performing the control of the reproduction. This allows the copy control to be executed even in recording/reproducing the signal resulting from decoding the digital signal.

Figure 9:
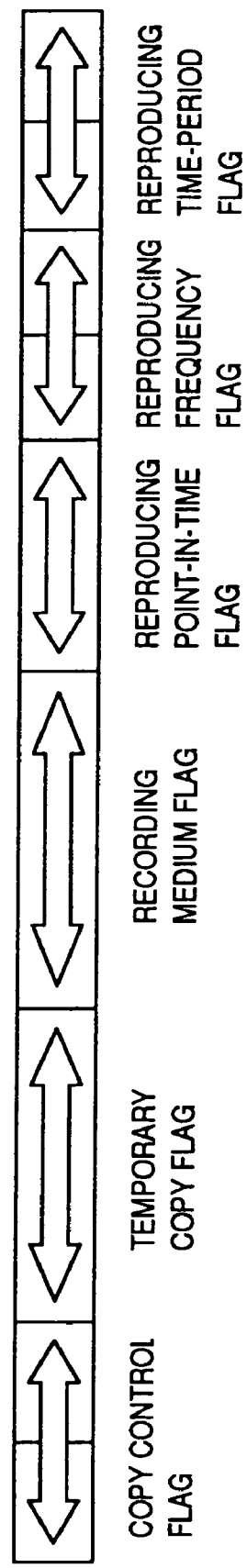
FIG. 9 is a diagram for illustrating bit configuration examples of the control flags of the present invention.

FIG. 9 illustrates bit configuration examples of the control flags. The respective control flags are represented by the following bits: The copy control flags: 2 bits, the Temp. Copy flag: 1 bit, the recording medium flag: 1 bit, the reproducing point-in-time flag: 1 bit, the reproducing time-period flag: 2 bits, and the reproducing frequency flag: 2 bits. The Temp. Copy flag, the recording medium flag, and the reproducing point-in-time flag take 2 possible values, i.e., 1 or 0. For example, the recording medium flag is set to be 0 when the recording is also permitted toward an extraction-capable recording medium such as a high-capacity recording/reproducing optical disk, and the recording medium flag is set to be 1 when the recording is permitted only toward an extraction-incapable recording medium such as a hard disk drive. Also, the reproducing point-in-time flag is set to be 1 if the reproducing-capable point-in-time is assumed to be a point-in-time by 9 o'clock at night on the recording day, and the reproducing point-in-time flag is set to be 0 when there exist no limitations. The reproducing time-period flag and the reproducing frequency flag take 4 possible values, i.e., 0 to 3. For example, the reproducing-capable time-periods are set to be time-periods that are 1 hour, 4 hours, 24 hours, and 48 hours after the recording point-in-time, respectively, or the reproducing-capable frequencies are set to be frequencies that are 1 time, 2 times, 3 times, and 4 times, respectively. The respective flags are allowed to be set more minutely, or it is allowable to add none of the flags.

According to the digital signal receiving apparatus and the digital signal recording/reproducing apparatus based on the present invention, even toward the digital signal permitting no recording, e.g., the digital signal the copy control flag of which is the Never Copy, the addition of the control flag permitting the temporary copy allows the user to execute the time-shift recording/reproducing and to prevent the recording/reproducing other than the time-shift recording/reproducing. Consequently, it becomes possible to simultaneously satisfy the broadcasting station side's needs for the copy limitation and the user side's needs for the time-shift.

The invention may be embodied in other specific forms without departing from the spirit or essential characteristic thereof. The present embodiment is therefore to be considered in all respects as illustrative and not restrictive, the scope of the invention being indicated by the appended claims rather than by the foregoing description and range of equivalency of the claims are therefor intended to be embraced therein.

What is claimed is:

1. A digital signal recording/reproducing apparatus for recording an inputted digital signal into a recording medium and reproducing said digital signal from said recording medium, comprising:
   a recording circuit for recording said digital signal into said recording medium, a control flag being added to said inputted digital signal;
   a reproducing circuit for reproducing said digital signal from said recording medium; and
   a detecting/controlling circuit for detecting said control flag and controlling said recording circuit and reproducing circuit, wherein said control flag includes a copy restriction configured to restrict copying of said digital signal,
   wherein said detecting/controlling circuit causes said digital signal to be recorded into said recording medium even though said control flag indicates the copy restriction.

2. The apparatus according to claim 1, wherein a new control flag is added to said digital signal when said inputted digital signal is recorded into said recording medium, and said digital signal is reproduced in accordance with a condition of said new control flag when said digital signal is reproduced from said recording medium.

3. The apparatus according to claim 1, wherein said control flag includes a recording medium flag indicative of information relative to a type of said recording medium to be permitted a recording, and the recording is permitted when said recording medium is a recording medium specified by said recording medium flag.

4. The apparatus according to claim 1, wherein said control flag includes a reproducing time flag indicative of information relative to a time to be permitted a reproduction, and a reproduction from said recording medium is permitted prior to the time indicated on said reproducing time flag.

5. The apparatus according to claim 1, wherein said control flag includes a reproducing time-period flag indicative of information relative to a time period to be permitted a reproduction, and the reproduction from said recording medium is permitted within the time period indicated on said time-period flag.

6. The apparatus according to claim 1, wherein said control flag includes a reproducing frequency flag indicative of information relative to a frequency to be permitted a reproduction, and the reproduction from said recording medium is permitted within the frequency indicated on said reproducing frequency flag.

7. The apparatus according to claim 1, wherein said control flag includes a recording medium flag indicative of information relative to a type of a recording medium to be permitted a reproduction, and the reproduction is permitted when said recording medium is a recording medium specified by said recording medium flag.

8. A digital signal receiving apparatus for receiving a transmitted digital signal and outputting the digital signal to a recording/reproducing apparatus, comprising a detecting/controlling circuit for detecting a control flag and controlling said recording/reproducing apparatus, said control flag being added to said received digital signal, wherein said control flag includes a copy restriction configured to restrict copying of said digital signal,
   wherein said detecting/controlling circuit causes said digital signal to be recorded into said recording medium by said recording/reproducing apparatus even though said control flag indicates the copy restriction.

9. The apparatus according to claim 8, wherein said detecting/controlling circuit controls a reproduction from said recording medium in accordance with a condition of said control flag.

10. The apparatus according to claim 8, wherein said detecting/controlling circuit adds a new control flag to said digital signal when said inputted digital signal is recorded into said recording medium, and performs a reproduction in accordance with a condition of said new control flag.

11. The apparatus according to claim 8, wherein said control flag includes a recording medium flag indicative of information relative to a type of said recording medium to be permitted a recording, and said detecting/controlling circuit permits the recording when said recording medium is a recording medium specified by said recording medium flag.

12. The apparatus according to claim 8, wherein said control flag includes a reproducing time flag indicative of information relative to a time to be permitted a reproduction, and said detecting/controlling circuit permits the reproduction from said recording medium prior to the time indicated on said reproducing time flag.

13. The apparatus according to claim 8, wherein said control flag includes a reproducing time-period flag indicative of information relative to a time period to be permitted a reproduction, and said detecting/controlling circuit permits the reproduction from said recording medium within the time period indicated on said time-period flag.

14. The apparatus according to claim 8, wherein said control flag includes a reproducing frequency flag indicative of information relative to a frequency to be permitted a reproduction, and said detecting/controlling circuit permits the reproduction from said recording medium within the frequency indicated on said reproducing frequency flag.

15. The apparatus according to claim 8, wherein said control flag includes a recording medium flag indicative of information relative to a type of a recording medium to be permitted a reproduction, and said detecting/controlling circuit permits the reproduction when said recording medium is a recording medium specified by said recording medium flag.

* * * * *